United States Patent [19]
Abbott
[11] 3,916,263
[45] Oct. 28, 1975

[54] MEMORY DRIVER CIRCUIT WITH THERMAL PROTECTION

[75] Inventor: Warwick R. Abbott, Woburn, Mass.
[73] Assignee: Honeywell Information Systems Inc., Waltham, Mass.

[22] Filed: May 30, 1974
[21] Appl. No.: 474,483

Related U.S. Application Data

[63] Continuation of Ser. No. 207,251, Dec. 13, 1971, abandoned.

[52] U.S. Cl. .................... 317/40 R; 317/16; 317/31; 317/33 R
[51] Int. Cl.² .................... H02H 5/04
[58] Field of Search ............. 317/40 R, 41; 307/202, 307/215, 310, 213, 214; 330/207 P, 69, 143, 140; 323/68, 69, 75 F, 75 H; 337/381; 219/501, 504, 505, 507

[56] References Cited

UNITED STATES PATENTS

| | | | |
|---|---|---|---|
| 3,387,206 | 6/1968 | Sampson | 323/69 |
| 3,439,186 | 4/1969 | Seelbach | 307/215 |
| 3,449,680 | 6/1969 | Schilb et al. | 330/207 P |
| 3,510,685 | 5/1970 | Watanabe et al. | 307/215 |
| 3,515,899 | 6/1970 | May | 307/215 |
| 3,560,770 | 2/1971 | Gieles | 307/310 |
| 3,634,871 | 1/1972 | Siedband | 317/40 R |
| 3,638,049 | 1/1972 | Wouterus Bom | 307/310 |
| 3,657,574 | 4/1972 | Christensen | 307/202 X |
| 3,681,615 | 8/1972 | Ricci | 307/215 |
| 3,701,004 | 10/1972 | Tuccinardi et al. | 307/310 X |

*Primary Examiner*—J. D. Miller
*Assistant Examiner*—Patrick R. Salce
*Attorney, Agent, or Firm*—David A. Frank; Ronald T. Reiling

[57] ABSTRACT

This invention provides a fast response driver circuit with a thermal protection network for charging and discharging capacitive loads of the type found in semiconductor memories of data processing units. To ensure rapid response to input signals, the circuit comprises separate amplifying networks for rising and falling output signals. The driver circuit includes a protection network, activated by a thermally sensitive element, which disables the two amplifier networks in the event that the temperature of the element is above a selected value. The protection circuit is arranged so that an increase in supply voltage causes the protection network to be more sensitive as temperature increases. A status indicator network is included for communicating the state of the driver circuit output to circuits associated with the semiconductor memory.

11 Claims, 3 Drawing Figures

MEMORY DRIVER CIRCUIT WITH THERMAL PROTECTION

This is a continuation of application Ser. No. 207,251, filed Dec. 13, 1971, and now abandoned.

BACKGROUND OF THE INVENTION

This invention pertains to circuits associated with semiconductor memory arrays. More particularly, consideration is given to control or driving circuits necessary for operation of these arrays. Each unit in a semiconductor memory array is typically comprised of a plurality of metal-oxide-semiconductor (MOS) field-effect-transistors (FETs). The memory units are coupled to two control lines which govern the read, the write, and the refresh operations (c.f. U.S. Pat. No. 3,585,613). To accomplish these operations, each control line is coupled to at least one FET device base element for each of several units. Therefore a relatively large capacitive load (500pf in a typical memory array) is presented to the circuit driving the control lines. In spite of the large capacitive load, it is a requirement that the output of the driver circuit respond rapidly (i.e., within 30ns in the present embodiment) to input signals. Further, the MOSFET memory cells are designed to operate between voltage levels that are approximately 20 volts apart, as compared with associated transistor-transistor-logic (TTL) control circuits which employ states approximately 4 volts apart.

It is also necessary to provide overload protection for the driving circuit and the associated power supplies. In the event of an overload condition, such as a short circuit, this condition must be relieved before the circuit elements can be damaged. It is known in the art to use a fuse or a current limiting device in order to limit the overload current. However it has been found that the damage due to the overload condition is typically the consequence of excessive heating of the driver resulting from the circuit fault. It is therefore known in the art to provide a temperature sensitive network to disable the amplifying networks when the temperature rises above a specified value (E. L. Long and T. M. Frederiksen, IEEE Journal of Solid-State Circuits, Vol. SC-6, No. 1, pp. 35–44, 1971; and R. J. Widlar, IEEE Journal of Solid-State Circuits, Vol. SC-6, No. 1, pp. 2–7, 1971). A semiconductor diode element can be used as a temperature sensitive element. For example, the variation of resistance across the semiconductor diode can be used in an appropriate circuit to determine a threshold voltage value obtained at a predetermined temperature value. In addition, it is further desirable to arrange the protection network so that the network is more temperature-sensitive when the power supply delivers an overvoltage to the driver circuit. Thus, the driver circuit is disabled more quickly under voltage conditions that are potentially more damaging.

The driver circuit of a control line should be capable of communicating to associated circuits the state of the control line. This information prohibits undesirable manipulation of the memory array. Each driver network has provision for supplying logic signals to external circuits signifying the state of the control line.

It is therefore an object of the present invention to drive a large capacitive load with fast rise and fall times.

It is a further object of the present invention to disable the output of the driver circuit when the temperature of the driver circuit is above a specified value.

It is another object of the present invention to disable the output of the driver circuit at a lower temperature when a power overvoltage is delivered to the circuit.

It is a still further object of the present invention to have provision for the communication of the state of the output of the driver circuit to the associated circuits in the data processing unit or in the memory control.

SUMMARY OF THE INVENTION

The aforementioned objectives are accomplished according to the present invention by an integrated circuit driver circuit, having a rapid response to input signals and providing voltage levels suitable for semiconductor memory manipulation, having a thermal protection network for guarding against overload conditions and having a network with an output suitable for signifying to associated circuits the state of the drive circuit.

The rapid response of the driver circuit is a result of the use of two amplifying networks, one for increasing output voltages and one for decreasing output voltages. The operation of each network is isolated from the other network during the initial period of response to a changing input voltage.

In the thermal protection network, overload conditions are sensed by an element responsive to thermal changes. Above a specified temperature, the thermally sensitive element causes a change in state in the thermal protection network which is transmitted to the two amplifying networks. The amplifying networks are thereby disabled until the temperature of the thermally sensitive element falls below the specified value.

A network, responsive to the state of the driver circuit, provides output signals at levels compatible with the associated circuits. These levels may be used to communicate the availability or lack of availability to external circuits of the elements affected by the drive circuit. The activation of the thermal protection circuit also causes the lack of availability of the memory array to be communicated to associated circuits.

DESCRIPTION OF THE PREFERRED EMBODIMENT

Figure 1:
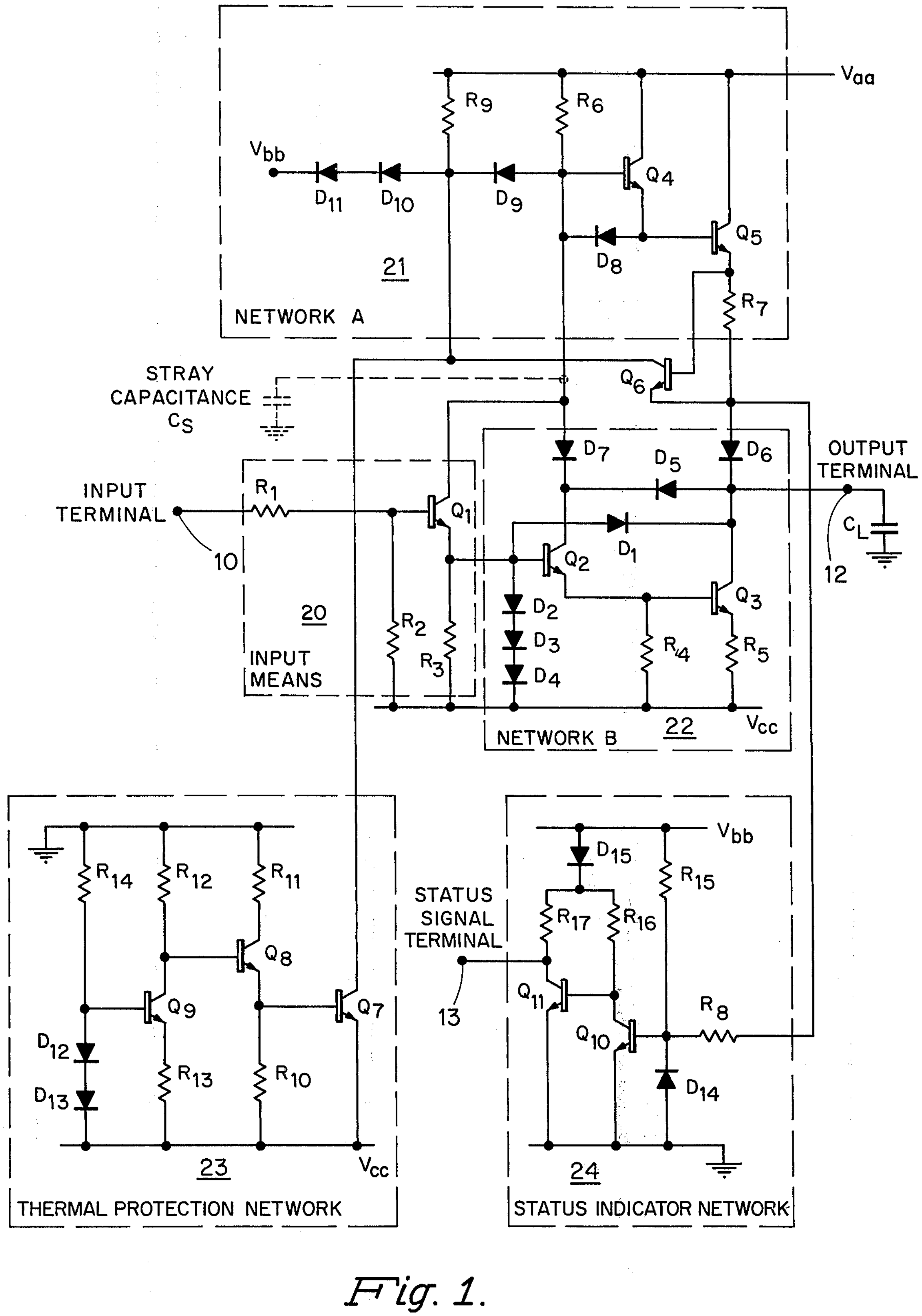
FIG. 1 is the detailed schematic diagram of the memory driver circuit according to the preferred embodiment of the present invention.

Description of FIG. 1

Referring now to FIG. 1, the Input Means 20 includes resistors $R_1$, $R_2$ and $R_3$, and transistor $Q_1$. The Input Terminal 10 is coupled through resistor $R_1$ to the base of transistor $Q_1$ and to one terminal of resistance $R_2$. The second terminal of resistor $R_2$ is coupled to power supply $V_{cc}$. The emitter of transistor $Q_1$ is coupled to the base of transistor $Q_2$, the anode of diode $D_1$, the anode of diode $D_2$ and through resistor $R_3$ to power supply $V_{cc}$.

Network B of FIG. 1 is comprised of diodes $D_1$, $D_2$, $D_3$, $D_4$, $D_5$, $D_6$ and $D_7$, resistors $R_4$ and $R_5$, and transistors $Q_2$ and $Q_3$. The cathode of diode $D_2$ is coupled to the anode of diode $D_3$, while the cathode of diode $D_3$ is coupled to the anode of diode $D_4$. The cathode of diode $D_4$ is coupled to power supply $V_{cc}$. The emitter of transistor $Q_2$ is coupled to the base of transistor $Q_3$ and through resistor $R_4$ to power supply $V_{cc}$. The emitter of transistor $Q_3$ is coupled through resistor $R_5$ to power supply $V_{cc}$. The collector of transistor $Q_3$ is coupled to Output Terminal 12, the anode of diode $D_5$, the cathode of diode $D_6$ and the cathode of diode $D_1$. The cathode of diode $D_5$ is coupled to the cathode of diode $D_7$ and the collector of transistor $Q_2$.

In FIG. 1, Network A includes diodes $D_8$, $D_9$, $D_{10}$ and $D_{11}$, resistors $R_6$, $R_7$, and $R_9$ and transistors $Q_4$ and $Q_5$. The anode of diode $D_7$ is coupled to the collector of transistor $Q_1$, the cathode of diode $D_8$, the base of transistor $Q_4$, the anode of diode $D_9$ and through resistor $R_6$ to power supply $V_{aa}$. The stray capacitance $C_s$ of the circuit is assumed to be coupled between the anode off diode $D_7$ and ground potential. The collector of transistor $Q_4$ is coupled to power supply $V_{aa}$. The emitter of transistor $Q_4$ is coupled to the anode of diode $D_8$ and the base of transistor $Q_5$. The collector of transistor $Q_5$ is coupled to the power supply $V_{aa}$, while the emitter of $Q_5$ is coupled to the base of transistor $Q_6$ and one terminal of resistor $R_7$. The emitter of transistor $Q_6$ is coupled to the second terminal of resistor $R_7$, the anode of $D_6$ and one terminal of resistor $R_8$. The collector of transistor $Q_6$ is coupled to the collector of transistor $Q_7$, the cathode of diode $D_9$, the anode of diode $D_{10}$ and through resistor $R_9$ to power supply $V_{aa}$. The cathode of diode $D_{10}$ is coupled to the anode of diode $D_{11}$ while the cathode of diode $D_{11}$ is coupled to power supply $V_{bb}$.

The Thermal Protection Network is comprised of diodes $D_{12}$ and $D_{13}$, resistors $R_{10}$, $R_{11}$, $R_{12}$, $R_{13}$ and $R_{14}$, and transistors $Q_7$, $Q_8$ and $Q_9$. The emitter of transistor $Q_7$ is coupled to power supply $V_{cc}$, while the base of transistor $Q_7$ is coupled to the emitter of transistor $Q_8$ and, through resistor $R_{10}$, to power supply $V_{cc}$. The collector of transistor $Q_8$ is coupled through resistor $R_{11}$ to ground potential, while the base of $Q_8$ is coupled to the collector of transistor $Q_9$ and through resistor $R_{12}$ to ground potential. The emitter of transistor $Q_9$ is coupled through resistor $R_{13}$ to power supply $V_{cc}$, while the base of transistor $Q_9$ is coupled to the anode of diode $D_{12}$ and through resistor $R_{14}$ to ground potential. The anode of diode $D_{13}$ is coupled to the cathode of diode $D_{12}$, while the cathode of diode $D_{13}$ is coupled to power supply $V_{cc}$.

The Status Indicator Network includes diodes $D_{14}$ and $D_{15}$, resistors $R_8$, $R_{15}$, $R_{16}$ and $R_{17}$ and transistors $Q_{10}$ and $Q_{11}$. The second terminal of resistor $R_8$ is coupled to the cathode of diode $D_{14}$, to the base of transistor $Q_{10}$, and through resistor $R_{15}$ to power supply $V_{bb}$. The anode of diode $D_{14}$ and the emitter of transistor $Q_{10}$ are coupled to ground potential. The collector of transistor $Q_{10}$ is coupled to the base of transistor $Q_{11}$ and to one terminal of resistor $R_{16}$. The second terminal of $P_{16}$ is coupled to one terminal of resistor $R_{17}$ and to the cathode of diode $D_{15}$. The anode of diode $D_{15}$ is coupled to power supply $V_{bb}$. The second terminal of resistor $R_{17}$ is coupled to the collector of transistor $Q_{11}$ and the terminal labelled Status Signal Terminal 13. The emitter of transistor $Q_{11}$ is coupled to ground potential.

Output Terminal 12 is shown coupled to a capacitor $C_L$, representing the capacitive nature of the load in the application of the present invention for driving semiconductor memory units.

The circuit of FIG. 1 may be implemented with discrete elements or with integrated circuit techniques. Transistors $Q_3$ and $Q_5$ are power devices and are rated to operate at maximum voltage and maximum current for the length of time necessary to activate the Thermal Protection Network. This rating prevents damage to these elements under overload conditions before the activation of the Thermal Protection Network. In the preferred embodiment, power supply $V_{aa}$ has a potential of +7 volts relative to ground potential, power supply $V_{bb}$ has a potential of +5 volts relative to ground potential and power supply $V_{cc}$ has a potential of −15 volts relative to ground potential. The resistors in the preferred embodiment have the following values; $R_5$ and $R_7$ are 0.6Ω, $R_4$ is 64Ω, $R_3$ is 390Ω, $R_1$ and $R_{13}$ are 500Ω, $R_{16}$ is 1 × $10^3$Ω, $R_6$ is 1.3 × $10^3$Ω, $R_{17}$ is 2 × $10^3$Ω, $R_{10}$ is 3 × $10^3$Ω, $R_8$ and $R_{15}$ are 5 × $10^3$Ω, $R_9$ and $R_{11}$ are 7 × $10^3$Ω, and $R_{12}$ and $R_{14}$ are 14 × $10^3$Ω. However, other values of power supply potential and of resistance may be chosen.

OPERATION OF THE CIRCUIT

Figure 2:
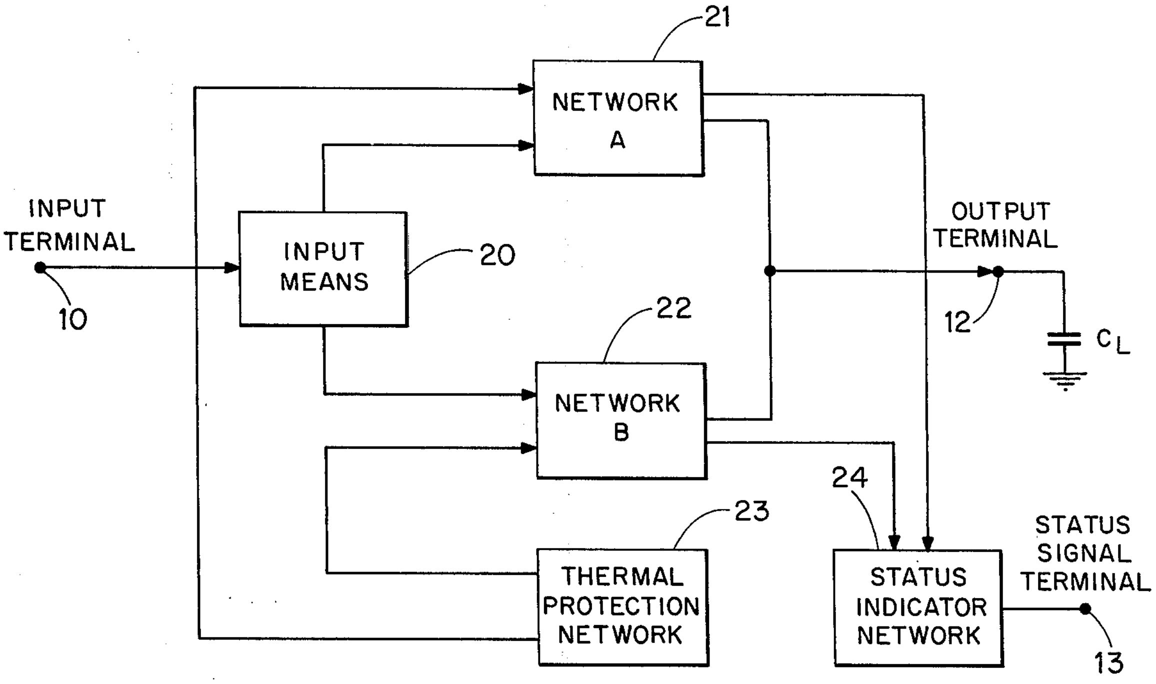
FIG. 2 is the block diagram of the component networks of the memory driver circuit of FIG. 1.
Figure 3:
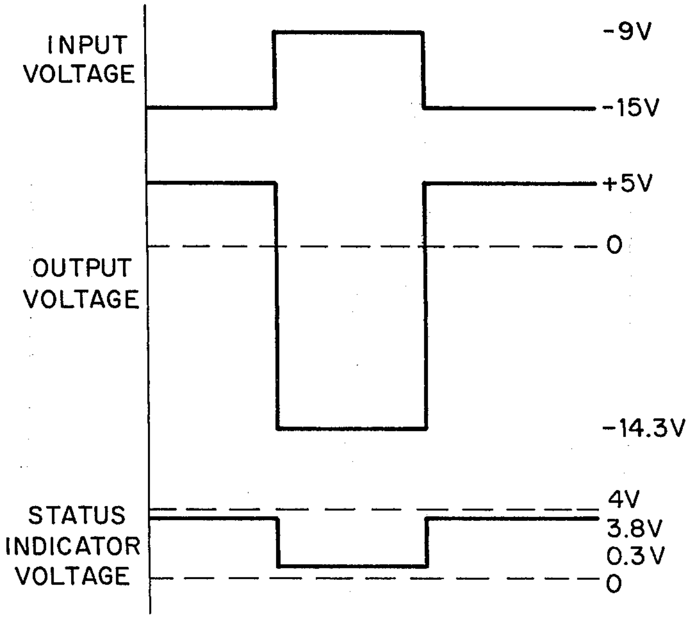
FIG. 3 displays typical input signals as well as the corresponding output signals and status signals for the memory driver circuit of FIG. 1 as a function of time.

The general operation of the bipolar integrated circuit driver circuit is understood by referring to FIG. 2. A voltage of −15V applied to Input Terminal 10 is increased abruptly to −9V. Input Means 20 then activates Network B 22, causing the voltage at Output Terminal 12 to fall from +5 volts to −14.3 volts by discharging the load capacitor $C_L$. Concurrently the change in voltage at Output Terminal 12 is coupled to Status Indicator Network 24 causing the Status Signal Terminal 13 to change from approximately 3.8 volts (a voltage level indicating a binary signal which is called a logic "1" signal for typical TTL circuits) to approximately 0.3 volts (a voltage level indicating a binary signal which is called a logic "0" signal for typical TTL circuits). This signal from the Status Signal Terminal 13 may be applied to other networks to communicate the state (i.e., voltage level) of Output Terminal 12. The voltage applied to Input Terminal 10 is next changed from −9 volts to −15 volts. The falling voltage level activates Network A 21 which drives the voltage at Output Terminal 12 from −14.3 volts to +5 volts, thereby charging load capacitance $C_L$. The Status Indicator Network 24 responds to the change in the voltage at Output Terminal 12 by substituting a logic "1" signal for the logic "0" signal. Typical waveforms of the ideal operation of the driver circuit are shown in FIG. 3. Rise and fall times of 30ns for a 500pf load capacitance are achieved by the preferred embodiment. A thermally sensitive element in the Thermal Protection Network 23 monitors the temperature. When the temperature of the driver circuit is above a specified value, the Thermal Protection Circuit diables both Network A 21 and Network B 22. Activation of the Thermal Protection 23 circuit results in the Status Signal Terminal 13 being a logic "0" signal.

A more detailed description of the operation of the driver circuit is now made referring to FIG. 1. First, the Thermal Protection Network 23 is described. Diode $D_{13}$ has a negative temperature coefficient of approximately −1.6mV/°C when $R_{14}$ is 14 × $10^3$Ω and power supply $V_{cc}$ is −15 volts. The diode $D_{13}$ is part of the bipolar integrated circuit. In the present embodiment, the Thermal Protection Network is activated at T =

150°C. At that temperature, the voltage across diode $D_{13}$ is sufficiently low so as to render transistor $Q_9$ de-saturated. The de-saturation of transistor $Q_9$ results in a voltage level of approximately −13.4 volts at the collector of transistor $Q_9$. The voltage at the collector of $Q_9$ causes transistor $Q_8$ to conduct, and in turn causes transistor $Q_7$ to conduct so that the potential of the collector of transistor $Q_7$ is close to the potential of power supply $V_{cc}$. Thus, the base potentials of transistors $Q_4$ and $Q_5$ become negative and these transistors are non-conducting, thereby disabling Network A 21. If the Output Terminal 12 is connected to ground potential, the most frequent circuit fault, diode $D_6$ prevents reverse base-emitter breakdown current from flowing through power transistor $Q_5$. The collector voltage of transistor $Q_7$ further lowers the collector voltage of transistor $Q_1$ and transistor $Q_2$ so that these transistors, as well as transistor $Q_3$, will be non-conducting thereby disabling Network B. (Depending on the transistor characteristics, however, an inconsequential current may flow through diode $D_5$, transistor $Q_2$ and resistor $R_4$.) The negative voltage at the collector of transistor $Q_7$ will cause the collector of transistor $Q_6$ and consequently the emitter of transistor $Q_6$ to obtain a negative voltage. Thus a base of transistor $Q_{10}$ will be a negative voltage. A negative voltage applied to the base of transistor $Q_{10}$ causes transistor $Q_{10}$ to become non-conducting causing a collector voltage of $Q_{10}$ to rise. This rise in voltage at the collector of transistor $Q_{10}$ causes transistor $Q_{11}$ to become conducting and the collector voltage of transistor $Q_{11}$ and consequently the Status Signal Terminal 13 to be a logic "0" signal, thereby disabling further manipulation of the circuit or of the memory array by external circuits. The series connection of diode $D_{13}$, diode $D_{12}$ and resistor $R_{14}$ and the series connection of resistor $R_{12}$, transistor $Q_9$ and resistor $R_{13}$ between power supply $V_{cc}$ and ground make the Thermal Protection Network more sensitive to temperature changes for an overvoltage condition in the power supply. For some power supply voltage $V_{cc}$ more negative than −15 volts in the present embodiment, transistor $Q_9$ is non-conducting at a lower temperature. (In the preferred embodiment, if power supply voltage $V_{cc}$ is approximately −20V, the Thermal Protection Network disables Network A and Network B at 25°C). This arrangement of elements adds further protection to the circuit in the potentially more serious overload condition arising from an overvoltage of the power supply. In the present embodiment, the Thermal Protection Network 23 is coupled to be sensitive to power supply voltage $V_{cc}$, the largest absolute potential relative to ground potential. However, similar protection for overvoltages of power supplies $V_{aa}$ and $V_{bb}$ is possible.

Referring next to FIG. 1 and FIG. 2, the Input Means 20 comprises a transistor $Q_1$, utilized in a phase-splitter circuit. The emitter of transistor $Q_1$ is coupled to Network B 22, while the collector of transistor $Q_1$ is coupled to Network A 21.

In Network B (when the Thermal Protection Network has not been activated) of FIG. 1, the combination comprising transistors $Q_1$, $Q_2$ and $Q_3$ discharges the load, $C_L$, from approximately +5V to −14.3V when the potential at Input Terminal 10 changes from −15V to −9V. Initially, transistors $Q_1$ and $Q_2$ form a modified Darlington amplifier pair (c.f. Transistors and Active Circuits, Linvill and Gibbons, page 373; McGraw-Hill, 1961) which discharges the stray capacitance $C_s$. This discharge occurs more rapidly than transistor $Q_3$ is able to discharge the load capacitance $C_L$. The difference between these two discharge rates ensures that transistors $Q_4$ and $Q_5$ (a Darlington amplifier pair comprising Network A) are non-conducting during the initial operation of Network B. The voltage of the base of transistor $Q_4$ is approximately equal to the collector voltage of transistor $Q_3$ and this equality ensures that transistors $Q_4$ and $Q_5$ are non-conducting until $C_s$ is discharged. When $D_5$ begins to conduct, transistors $Q_2$ and $Q_3$ function as a Darlington amplifier pair. Diode $D_5$ helps to discharge the load capacitor $C_L$ to a voltage lower than is possible with transistors $Q_2$ and $Q_3$ plus associated circuit elements alone, while contributing to the base drive current of transistor $Q_3$. (Diode $D_7$ is provided to decouple the load from the Thermal Protection Network during circuit shut-down.) This arrangement ensures a rapid discharge without simultaneous conduction of Network A and Network B. Conduction through diode $D_5$ stops when the voltage at Output Terminal 12 falls to approximately −13 volts, thereby allowing transistor $Q_3$ to saturate and provide the maximum voltage swing. (Diode $D_1$ is optional and is used for providing additional hold-off bias [i.e., for conduction] for transistors $Q_4$ and $Q_5$, and thereby reducing simultaneous conduction of Network A and Network B when the output potential is low. However, the available change in voltage at Output Terminal is consequently reduced by the voltage drop across one diode.)

The operation of Network A can be understood by referring again to FIG. 1. A change in voltage from −9 volts to −15 volts of Input Terminal 10 changes transistor $Q_1$ from a conducting to a non-conducting state. The non-conduction of transistor $Q_1$ causes transistors $Q_4$ and $Q_5$, which form a Darlington amplifier pair, to charge $C_L$ with an increasing voltage at Output Terminal 12. Transistors $Q_2$ and $Q_3$ are non-conducting as long as transistor $Q_1$ is non-conducting and therefore do not affect the charging of the load capacitors.

As described above, the collector of transistor $Q_{11}$ which provides the signal for the Status Signal Terminal 13 is approximately at ground potential when the Thermal Protection Network 23 has been activated. The output of the Status Indicator Network 24 is controlled by the voltage at Output Terminal 12. When Output Terminal 12 is approximately −14.3 volts, transistor $Q_{10}$ is non-conducting resulting in transistor $Q_{11}$ being conducting. Thus, the Status Signal Terminal 12 is a logic "0" signal. When the Output Terminal 12 is approximately +5 volts, transistor $Q_{10}$ is conducting and transistor $Q_{11}$ is non-conducting so that the Status Signal Terminal 12 is a logic "1" signal.

The above description along with numerical values is included for illustration of the operation of the preferred embodiment and is not meant to limit the scope of the invention. The scope of the invention is limited only by the following claims. A person skilled in the art can discern many changes and variations in the above description which are yet within the spirit and scope of the invention.

What is claimed is:

1. An integrated circuit electronic driver circuit used for driving capacitive loads of the type associated with MOSFET memory arrays comprising:

a first controllable network with a first output terminal;

a second controllable network diode-coupled to said first controllable network with a second output terminal;

a thermal protection network comprised of integrated circuit elements coupled to said first controllable network and to said second controllable network, said thermal protection network being responsive to thermal changes of said integrated circuit driver circuit for disabling said first controllable network and said second controllable network when said integrated circuit driver circuit exceeds a specified temperature, said thermal protection network including:

a thermally sensitive element, a pair of transistors, and a first switching element coupled to said thermally sensitive element, said thermally sensitive element determining a state of conduction or non-conduction of said first switching element, said thermally sensitive element causing a change of said state when a temperature of said thermally sensitive element exceeds a specified temperature, said pair of transistors responsive to said conduction state of said first switching element and providing a signal for disabling said first and said second controllable networks;

input means coupled to said first controllable network and said second controllable network for controlling said first controllable network and said second controllable network, said input means adapted to receive a first input signal and a second input signal, said input means causing said first controllable network to be conducting and said second controllable network to be non-conductive in response to said first input signal, said input means causing said first controllable network to be non-conducting and said second controllable network to be conducting in response to said second input signal;

a second switching element responsive to said disabling signal; and an indicator network, coupled to a one of said controller networks, for producing a first indicator signal when said one of said controllable networks is conducting and a second indicator signal when said one of said controllable networks is non-conducting, said indicator network further coupled to said thermal protection network by said second switching element wherein activation of said thermal protection network produces a one of said indicator signals.

2. The electronic driver circuit of claim 1 wherein said thermally sensitive element is a semiconductor diode and said first and said second switching elements are transistors, said semiconductor diode being coupled in a base circuit of said first transistor, and wherein said base circuit further comprises a second semiconductor diode and three resistors for lowering said specified temperature in response to an overvoltage condition being present in said thermal protection network, and wherein said pair of transistors of said thermal protection network are coupled as follows:

a first of said pair having its base connected to the collector of said first transistor and the second of said pair having its base connected to the emitter of said first of said pair, its emitter connected to a supply voltage, and its collector providing said disabling signal.

3. The electronic driver circuit of claim 2 wherein said thermally sensitive element and said first switching element are coupled to said supply voltage.

4. The electronic driver circuit of claim 3 wherein said second controllable network comprises:

a transistor amplifying pair and, a diode, said diode coupled between collector connections of each transistor of said transistor amplifying pair, wherein said diode permits an increase in the difference between the voltage at said second terminal when said second controllable network is conducting and the voltage at said second terminal when said second controllable network is non-conducting, said diode further providing a unidirectional path for rapid discharge of said capacitive load while contributing to the base drive current of one of said transistors of said transistor amplifying pair.

5. An integrated circuit electronic driver circuit of the type used for driving a capacitive load, typically associated with MOSFET Memory arrays, comprising:

a first switching amplifier coupled to said capacitive load;

a second switching amplifier coupled to said capacitive load, and diode-coupled to said first switching amplifier;

a thermal protection network comprised of integrated circuit elements and coupled to said first switching amplifier and to said second switching amplifier, said protection network being responsive to thermal changes of said driver circuit for disabling said first switching amplifier and said second switching amplifier when said thermal network integrated circuit elements exceed a specified temperature, said thermal protection network including:

a thermally sensitive element, a pair of transistors, and a first transistor element coupled to said thermally sensitive element, said thermally sensitive element determining a state of conduction or non-conduction of said first transistor element, said pair of transistors responsive to said conduction state of said first transistor element and providing the signal for disabling said first and said second switching amplifiers, and a semiconductor diode and three resistors for lowering said specified temperature in response to an overvoltage condition being present in said thermal protection network;

an input amplifing network coupled to said first switching network and to said second switching network, said input amplifying network adapted to receive an input voltage, said input amplifying network causing said first switching amplifier to charge said capacitive load when said input voltage is below a first value, said input amplifying network causing said second switching amplifier to discharge said capacitive load when said input voltage is above a second value;

a second transistor element responsive to said disabling signal; and an indicator network coupled to said capacitive load and having a status terminal, for providing a first voltage level at said status terminal when said capacitive load is charged, and for providing a second voltage level at said status terminal when said capacitive load is discharged, said indicator network further coupled to said thermal protection network by said second transistor element for providing one of said voltage levels at said status terminal in response to said disabling signal.

6. The electronic driver circuit of claim 5 wherein said input amplifying network comprises a transistor coupled in a phase-splitter configuration and wherein an emitter element of said transistor is coupled to said second switching amplifier and a collector element of said transistor is coupled to said first switching amplifier.

7. The electronic driver circuit of claim 5 wherein said second switching amplifier comprises:

a first transistor amplifying pair for discharging stray capacitance in said driver circuit and for preventing the operation of said first switching amplifier during the initial operation of said second switching amplifier;

a second transistor amplifying pair;

a first diode coupled between collector terminals of each transistor of said second transistor amplifying pair for rapidly discharging said capacitive load and for permitting an increase in the difference between the voltage across said capacitive load when said capacitive load is charged and the voltage across said capacitive load when said capacitive load is discharged; and a second diode coupled between the collector terminal of one transistor of said second transistor amplifying pair and the base terminal of the other transistor of said second transistor amplifying pair for reducing simultaneous operation of said first switching amplifier and said second switching amplifier when the output voltage across said capacitive load is low;

and wherein said first switching amplifier comprises a third transistor amplifying pair.

8. An improved thermal protection network including a thermally sensitive element and an amplifying element, said thermally sensitive element determining a state of conduction or non-conduction of said amplifying element, said thermally sensitive element causing said amplifying element to alter said state above a specified temperature, and said thermal protection network adapted to receive a supply voltage; wherein the improvement comprises:

a semiconductor diode coupled to said first thermally sensitive element and to the base terminal of said amplifying element;

a first resistor coupled between the base terminal of said amplifying element and ground;

a second resistor coupled between the collector terminal of said amplifying element and ground;

a third resistor coupled between the emitter terminal of said amplifying element and said supply voltage; said improvement providing for a lowering of said specified temperature in response to an increased voltage in said supply voltage; and a pair of transistors, the first of said pair having its base connected to the collector terminal of said amplifying element, the second of said pair having its base connected to the emitter of said first of said pair, its emitter connected to said supply voltage, and its collector providing a signal indicating when said specified temperature is exceeded.

9. The thermal protection network of claim 8 wherein said thermally sensitive element comprise a semiconductor device.

10. The thermal protection network of claim 9 wherein said thermally sensitive elements comprise a semiconductor diode.

11. The thermal protection network of claim 10 wherein said amplifying element comprises a third transistor.

* * * * *